United States Patent [19]

Funatsu

[11] Patent Number: 5,029,092

[45] Date of Patent: Jul. 2, 1991

[54] DEVICE OF SUPPRESSING INCORRECT ALARMS FOR USE IN A COLLISION AVOIDANCE SYSTEM INSTALLED IN AN AIRPLANE

[75] Inventor: Chuhei Funatsu, Yokohama, Japan

[73] Assignee: Toyo Communication Equipment Co., Ltd., Japan

[21] Appl. No.: 352,590

[22] Filed: May 16, 1989

[51] Int. Cl.⁵ .............................................. G06F 15/50
[52] U.S. Cl. .................................. 364/461; 364/439; 364/424.06
[58] Field of Search .............................. 364/461, 439; 342/29–32, 455, 456

[56] References Cited

U.S. PATENT DOCUMENTS

| 4,063,073 | 12/1977 | Strayer | 364/439 |
| 4,121,287 | 10/1978 | Leal et al. | 364/461 |
| 4,380,050 | 4/1983 | Tanner | 364/461 |
| 4,623,466 | 11/1986 | O'Sullivan | 364/461 |
| 4,814,994 | 3/1984 | Doane et al. | 364/460 |
| 4,839,658 | 6/1989 | Kathol et al. | 342/455 |
| 4,853,700 | 8/1989 | Funatsu et al. | 342/30 |

FOREIGN PATENT DOCUMENTS 73478 4/1985 Japan .
65182 4/1986 Japan .
66482 3/1988 Japan .

*Primary Examiner*—Thomas G. Black
*Attorney, Agent, or Firm*—Diller, Ramik & Wight

[57] ABSTRACT

A device of suppressing incorrect alarms to be issued from an airplane collision avoidance system installed in a first airplane, wherein when it is found that a product obtained by multiplying a relative distance of the first airplane relative to a second airplane by a sine of a relative horizontal angle is constant or when it is found that results derived from a comparison between a relative speed of the first airplane relative to the second airplane and a speed vector in the direction toward the second airplane obtained from a relative horizontal angle of the first airplane relative to the second airplane and a speed of the first airplane in the direction of extension of a nose is substantially zero, it is determined that the second airplane is held in an immovable state, i.e., it stays in a waiting state.

5 Claims, 12 Drawing Sheets

DEVICE OF SUPPRESSING INCORRECT ALARMS FOR USE IN A COLLISION AVOIDANCE SYSTEM INSTALLED IN AN AIRPLANE

BACKGROUND OF THE INVENTION

1. Technical Field

The present invention relates to a device of preventing airplanes from colliding with each other and more particularly to a device of suppressing incorrect alarms to be issued from an airplane collision avoidance system installed in a first airplane in order to reduce useless warning operations to be performed by a pilot on the first airplane in relation to the incorrect alarms concerning a second airplane which approaches the first airplane.

2. Description of the Related Art

Hitherto, a large-sized or middle-sized airplane such as an air liner, a commuter or the like is usually equipped with an airplane collision avoidance system for estimating a possibility of causing the airplane (hereinafter referred to as a first airplane) to collide with other airplane which approaches the first airplane (hereinafter referred to as a second airplane) to issue alarms. Such an apparatus is provided with a question device to the second airplane and an ATC transponder adapted to respond to question signals from the second airplane.

On the other hand, a small-sized airplane such as a personal airplane or the like is equipped with an ATC transponder only in view of a problem incurred by installation of apparatus and device.

As is well known from experiences, not only an ATC transponder installed in an airplane flying in the air but also an ATC transponder in an airplane which stays in a waiting state on the airport or an airplane which is ready to start respond to question signals issued from a question device in the airplane collision avoidance system in the surrounding region of the airport where many airplanes are crowded and troubles take place often. In fact, the conventional airplane collision avoidance system from which alarms are frequently issued on the basis of response signals from the ATC transponder installed in an airplane which has no fear of causing a collision in the air has a drawback that it is very troublesome and dangerous for a pilot who requires concentrated attention before/after landing or taking-off. To obviate the foregoing drawback, the inventors invented a system of making a determination as to whether the second airplane stays in a waiting state or not, with reference to a difference between the time of direct receiving of response signals from ATC transponder installed in the second airplane in response to question signals from the airplane collision avoidance system installed in the first airplane and the time of indirect receiving of the same after reflection on the ground and already filed an application for patent with the Patent Office in Japan. However, it has been found that the aforementioned system is incomplete due to unstability in relation to exact receiving of response signals from ATC transponder after reflection on the ground.

SUMMARY OF THE INVENTION

The present invention has been made with the foregoing background in mind and its object resides in providing a device of suppressing incorrect alarms to be issued from an airplane collision avoidance system which assures that an airplane staying in a waiting state on the airport can be distinguished from an airplane flying in the air using response signals from an ATC transponder installed in the first airplane so that generation of useless alarms is reduced.

To accomplish the above object, the present invention provides a device of suppressing incorrect alarms to be issued from an airplane collision avoidance system installed in a first airplane comprising of obtaining a relative distance of the first airplane relative to a second airplane on the basis of a difference between the time when the air plane collision avoidance system sends question signals and the time when the airplane collision avoidance system receives response signals from an ATC transponder installed in the second airplane in response to the question signals, obtaining a relative speed from a quantity of variation of the relative distance per unit time, and making a determination in such a manner that the second airplane stays in a waiting state on an airport or it is held substantially immovable when it is found that a difference between the relative speed and a speed of the second airplane as seen in the direction toward the second airplane remain within a predetermined value, whereby generation of useless alarms is reduced.

In addition to the determination function as mentioned above, the device of the present invention includes a function of discriminating and separating only response signals from the ATC transponder in the second airplane staying in a waiting state on the airport or flying in the vicinity of the ground surface from other response signals on the basis of a difference between the time when response signals from the ATC transponder in the second airplane in response to question signals issued from the airplane collision avoidance system in the first airplane reach the airplane collision avoidance system directly and the time when they reach there indirectly after reflection on the ground so that response signals from an ATS transponder installed in an airplane held in an immovable state in the air are not excluded from the watching range in accordance with a logic which is concerned with discriminating signals generated from both the functions.

Other objects, features and advantages of the present invention will become more readily apparent from reading of the following description which has been made with reference to the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments thereof.

First, to facilitate understanding of the present invention, the aforementioned ATC transponder and a conventional airplane collision avoidance system will briefly be described below with respect to their function.

The ATC transponder is typically classified into three kinds in dependence on its own functions, i.e., an ATC transponder operable in accordance with a mode A having response signals with discriminating code informations only involved therein, an ATC transponder operable in accordance with a mode C having response signals with altitude informations only involved therein and an ATC transponder operable in accordance with a mode S having response signals with individual code informations, altitude informations or the like informations involved therein.

It should be noted that in addition to the individual code informations and altitude informations, informations representing that an airplane remains in a waiting state are involved in the response signals which have been generated by the ATC transponder operable in accordance with the mode S.

Accordingly, it is required that attention is paid to the fact that the ATC transponder to be processed in accordance with the system of the present invention is limited only to the mode A and the mode C.

Figure 1:
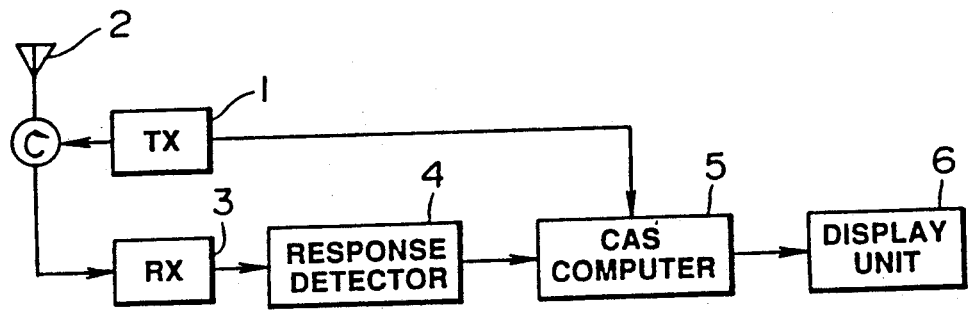
FIG. 1 is a block diagram illustrating the structure of a conventional airplane collision avoidance system.

Next, brief description will be made below with reference to FIG. 1 as to the airplane collision avoidance system which has been hitherto examined and researched.

An airplane having the airplane collision avoidance system as shown in the drawing installed therein (hereinafter referred to as a first airplane) sends from a sender (TX) 1 question signals in accordance with the mode A, C or S via an antenna (ANT) 2 and other airplane which is not shown in the drawing (hereinafter referred to as a second airplane) receives the question signals. Then, response signals from an ATC transponder installed in the other airplane are received by a receiver (RX) 3 via the antenna 2. The received signals are introduced via a resonance detector 4 into a collision avoidance system computor (hereinafter referred to as a CAS computor) 5 in which they are analized so that a relative distance between the first airplane and the second airplane is calculated, e.g., on the basis of a difference between the time when question signals are sent and the time when response signals are received by the ATC transponder. When the foregoing relative distance is in excess of a predetermined threshold, this is identified as a case where there is a danger that a collision takes place and a display unit 6 is then activated to provide an alarm. However, the conventional airplane collision avoidance system as constructed in the above-described manner has a problem that an unnecessary alarm is generated therefrom in spite of the fact that there is no need of avoiding an occurrence of collision if it is found that a period of time obtained in the aforementioned manner that elapses from the time when response signals from ATC transponder in the second airplane substantially staying in a waiting state on an airport are received by the apparatus in the first airplane when the latter enters the surrounding region of the airport, particularly, a landing approach course till the time when the first airplane collides with the second airplane remain within a predetermined time.

Figure 2:
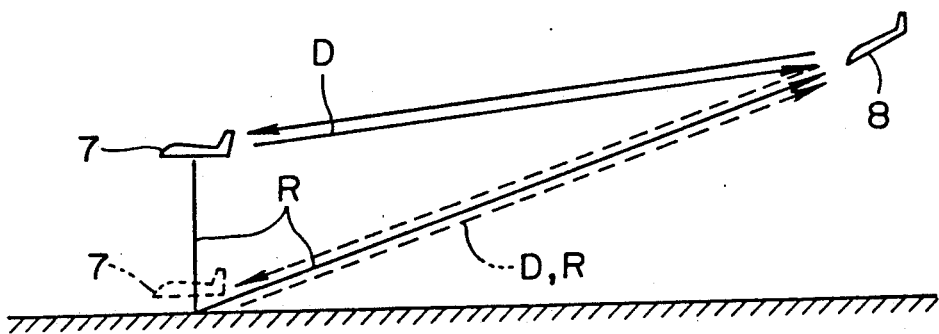
FIG. 2 is a schematic view illustrating direct receiving of response signals and indirect receiving of the same after reflection on the ground.

Although a method proposed to obviate the foregoing problem as shown in FIG. 2 wherein if a difference between the time when response signals from ATC transponder in the second airplane 7 are received directly by the apparatus in the first airplane 8 as represented by D and the time when they are received indirectly after reflection on the ground surface as represented by R is detected but it is zero, it is determined that the second airplane 7 stays in a waiting state, the apparatus has still a drawback that there is a possibility that incorrect determination is made if a response after reflection on the ground surface is weak due to the influence caused by the geometrical configuration of the ground surface or the surrounding buildings.

To obviate the foregoing drawback, the device of the present invention employs the following measures.

Figure 3:
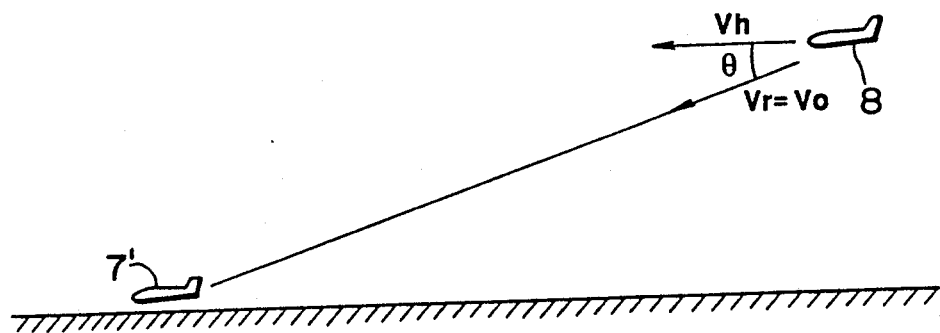
FIG. 3 is a schematic view illustrating a first technical idea in accordance with the present invention.

Specifically, according to this measure as shown in FIG. 3, in view of the fact that the second airplane 7' staying in a waiting state on the airport is considered substantially equal to the stopped state as viewed from the first airplane 8 flying in the air, provided that it remains, e.g., during a period of taxing, it is determined that the second airplane 7' remains in a waiting state, if it is found that a relative speed Vr of the first airplane 8 relative to the second airplane 7' is substantially equal to a directional speed vector Vo of the first airplane 8 relative to the second airplane 7'.

Figure 4:
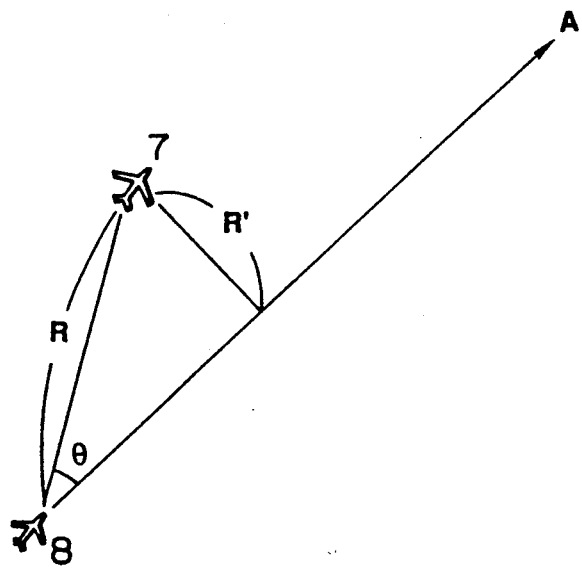
FIG. 4 is a schematic view illustrating a second technical idea in accordance with the present invention.

Alternatively, as shown in FIG. 4, in view of the fact that the second airplane 7' staying in a waiting or taxing state in the airport is substantially immovable, a technical concept that a value of R sin $\theta$ obtained by multiplying a relative distance R of the first airplane 8 flying in the direction of an arrow mark A relative to the second airplane 7 is constant within a required period of time is utilized for practicing the measure.

Figure 5A:
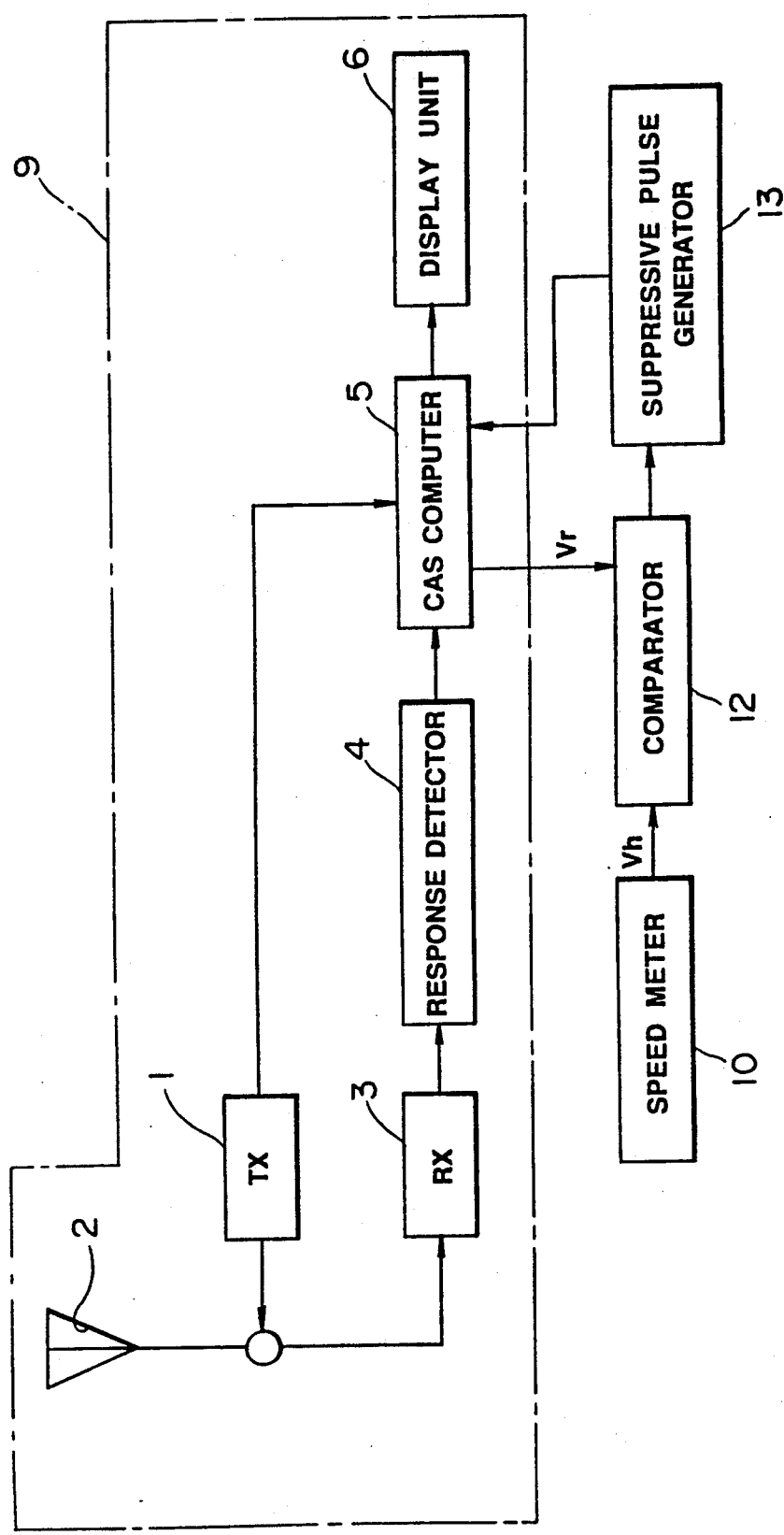
FIG. 5(a) is a block diagram illustrating an embodiment for practicing the first technical idea as shown in FIG. 3.

A simplest method of embodying the technical idea shown in FIG. 3 is as illustrated in FIG. 5(a). In detail, a relative distance R between the first airplane and the second airplane is calculated in a CAS computor on the basis of a difference between the time when question signals are sent from the first airplane and the time when response signals from ATC transponder in the second airplane are received, a relative speed Vr of the first airplane relative to the second airplane is derived from a quantity of variation Δ R of the relative distance R, a speed Vh of the first airplane in the direction of extension of a nose derived from a speed meter 10 is compared with the relative speed Vr in a comparator 12, and a suppressive pulse is outputted into the CAS computor from a suppressive pulse generator 13 by making a determination that the second airplane remains in a waiting state when the results derived from the foregoing comparison reveal that both the speeds are substantially identical to each other, whereby the method inhibits an unnecessary alarm from being issued.

Since a glide pass along which the first airplane is landing on the airport extends at the most in the range of 2 to 3.5 degrees, the speed of the first airplane in the direction of extension of the nose is substantially identical to the relative speed of the first airplane relative to the second airplane (as represented by Vr=Vh cos 3.5 =0.998 Vh). Thus, this property makes it possible to inhibit an unnecessary alarm from being issued on the basis of response signals sent from the transponder in the second airplane staying in a waiting state.

As the first plane approaches a runway to land on the airport, a horizontal angle of the second airplane staying in a waiting state on the airport relative to the first airplane, i.e., a bearing of the second airplane is increased gradually. This leads to a necessity for compensating the error attributable to the bearing.

Figure 5B:
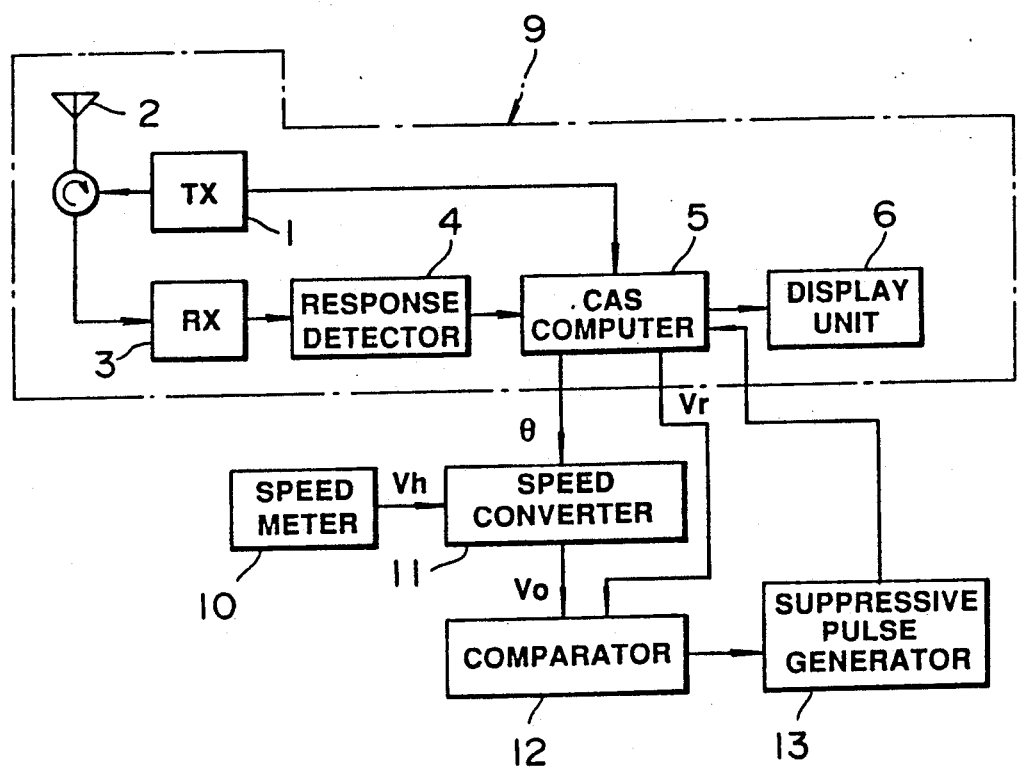
FIG. 5(b) is a block diagram illustrating another embodiment which has been improved from the embodiment shown in FIG. 5(a).

Another method in which the error attributable to the bearing is taken into account is as shown in FIG. 5 (b).

FIG. 5 (b) illustrate another embodiment which has been improved from the embodiment shown in FIG. 5 (a). In the drawing, reference numeral 9 designates the same airplane collision avoidance system as the conventional one shown in FIG. 1. A relative speed Vr of the first airplane relative to the second airplane and a relative horizontal angle $\theta$ of the first airplane relative to the second airplane are obtainable from a CAS computor 5.

Specifically, a relative distance R of the first airplane relative to the second airplane is derived from a difference between the time when question signals are sent and the time when response signals from ATS transponder in the second airplane are received and a relative speed Vr of the first airplane relative to the second airplane is calculated from a quantity of variation Δ R of the relative distance per unit time. On the other hand, a relative horizontal angle $\theta$ can be detected from a phase with which an electric wave is received by an antenna 2.

By inputting into a speed converter 11 both the speed Vh in the direction of extension of the nose derived from the speed meter 10 in the first airplane and the aforementioned relative horizontal angle $\theta$ to calculate a value of Vh cos $\theta$, a directional speed vector Vo of the first airplane relative to the second airplane is obtained and the directional speed vector Vo is then compared with the relative speed Vr in a comparator 12. If it is found that a difference between them remains within a predetermined threshold, a determination is made such that the second airplane is not substantially displaced, i.e., it stays in a waiting state. In response to this determination, a suppressive pulse is generated from a suppressive pulse generator 13 so that transmission of display signals from the CAS computor 5 to a display unit 6 is prevented.

Figure 6:
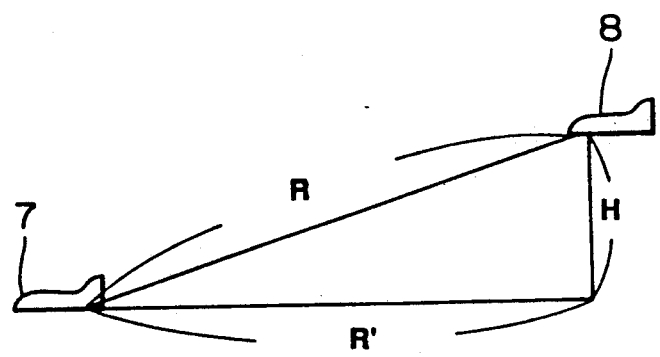
FIG. 6 is a schematic view illustrating an occurrence of error attributable to a differential height.

As shown in FIG. 6, the relative speed Vr calculated in the CAS computor 5 is derived from the relative distance R of the first airplane 8 relative to the second airplane 7. On the other hand, a directional speed vector Vo of the first airplane relative to the second airplane is calculated on the horizontal plane while a differential altitude H is not taken into account. A relationship between the relative speed Vr and the directional speed vector Vo is represented by Vr≈Vo as mentioned above. To compare the relative speed of the first airplane with the second airplane of the first airplane relative to the second airplane more exactly, it is required that the differential altitude between the first airplane and the second airplane is taken into account and the relative speed Vr is calculated on the basis of a distance R. on the horizontal plane.

Figure 7:
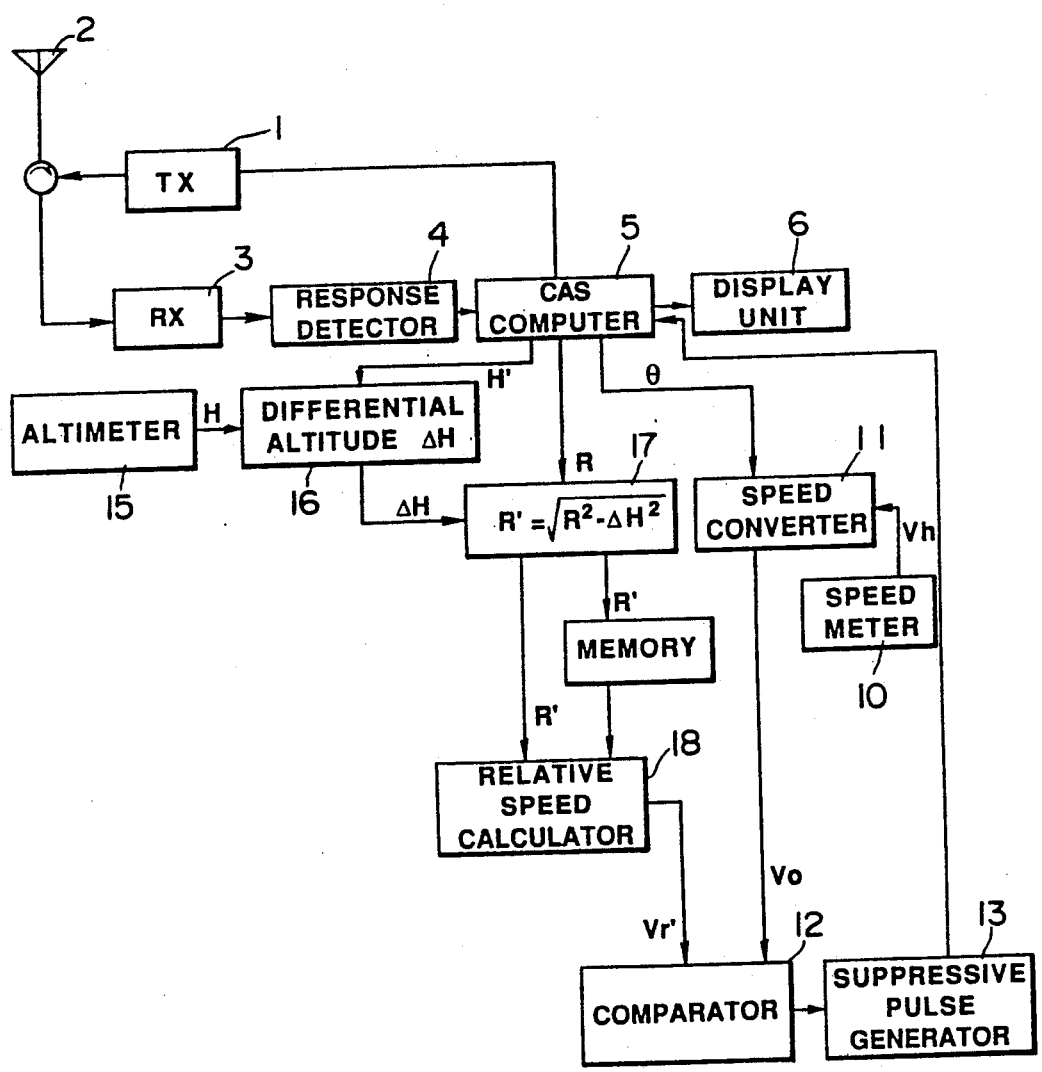
FIGS. 7 and 8 are block diagrams illustrating another embodiments of the present invention, wherein errors attributable to a differential altitude are compensated.

FIG. 7 illustrate an embodiment including a differential height compensating device, wherein signals are received in accordance with the mode C.

Different points between the embodiment in FIG. 7 and the embodiment in FIG. 5 consist in that an altitude information H' concerning the second airplane outputted from the CAS computor 5 and an altitude information H derived from an altimeter 15 in the first airplane are inputted into a differential altitude calculator 16 to obtain a differential altitude ΔH, the relative distance R of the first airplane relative to the second airplane and the differential height ΔH are inputted into a calculator 17 to obtain a relative distance R' on the horizontal plane by performing a calculation represented by $\sqrt{R^2-\Delta H^2}$ in the calculator 17, a relative speed Vr' corrected with reference to the relative distance R' is calculated in a relative speed calculator 18 and the relative speed Vr' is then compared with the directional speed vector Vo of the first airplane relative to the second airplane.

With this construction, an occurrence of error attributable to the differential height can be prevented and it becomes possible to more exactly inhibit an unnecessary alarm from being issued.

Figure 8:
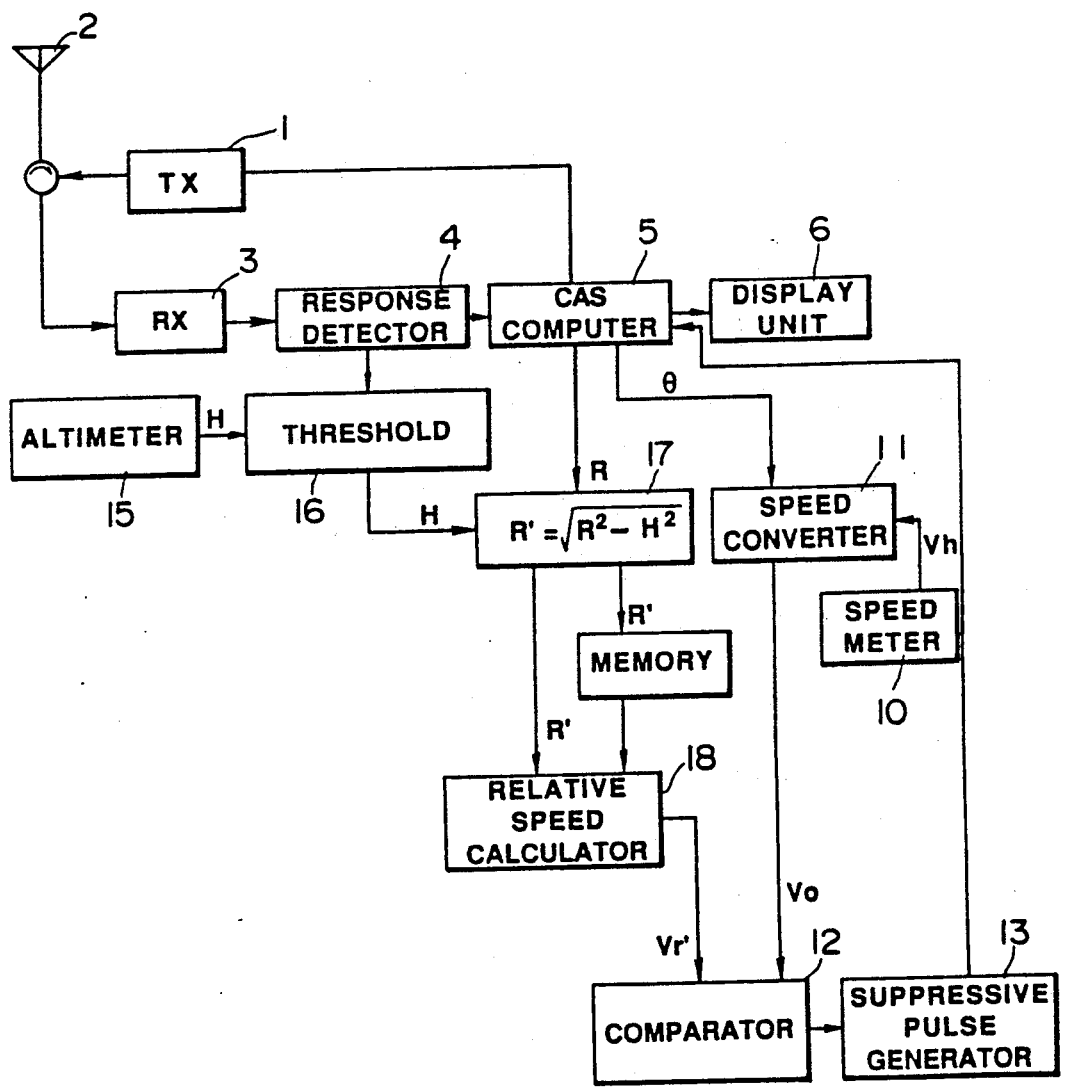

FIG. 8 illustrates another embodiment including the aforementioned compensating device, wherein signals are received in accordance with the mode A.

As is well known, since response signals generated in accordance with the mode A do not involve an altitude information, it is impossible to obtain the relative distance R' on the horizontal plane from both the differential height Δ H and the relative distance R.

For the reason, e.g., when response signals are sent from the second airplane in accordance with the mode A and the first airplane flies at an altitude less than 200 feet, it is assumed that the differential height between the first airplane and the second airplane is equal to the altitude of the first airplane. Then, a calculation represented by $\sqrt{R^2-H_2}$ is performed in the calculator 17 to obtain the relative distance R', the relative speed Vr' compensated with reference to the relative distance R' is calculated and the directional speed vector Vo of the first airplane relative to the second airplane is then compared with the relative speed Vr'. If it is found that a difference between the directional speed vector Vo and the relative speed Vr' remains within a predetermined threshold, it is determined that the second airplane is not substantially displaced, i.e., it stays in a waiting state. Then, a suppressive pulse is generated from the suppressive pulse generator 13 so that the transmission of a display signal from the CAS computor 5 to the display unit 6 is prevented.

As far as the speed meter 10 is concerned, it is preferable that it is designed to detect a speed relative to the ground. If the first airplane is of type including an inertia navigating system, it is most preferable to employ the method of utilizing an output from the inertia navigating system. Alternatively, the speed relative to the ground may be corrected using a speed meter for detecting a speed relative to the environmental air. Further, the altimeter 15 may be designed either in the form of an electric wave type altimeter or in the form of a barometric altimeter. From the viewpoint of requirement for an absolute altitude, it is advantageous to employ the electric wave type altimeter.

With such construction, in a normal case, the second airplane staying in a waiting state or in a taxing state without any danger of causing a collision in the air can reliably be distinguished from other dangerous airplane.

At present, however, among a number of airplanes put in practical use there are many airplanes which can stop in the air.

In fact, a helicopter is a typical airplane of the type which can stay in an immovable state the air and many helicopters are practically used. Another airplane of the foregoing type is a so-called VTOL airplane. At present, only a few VTOL airplanes are used as a special airplane but an increased demand for VTOL airplanes in future is expected.

When an airplane of the type which can stop in the air stays in an immovable state in the air, it can not be discriminated whether the airplane stays in a waiting state on the ground or stop in the air using only the system as shown in FIGS. 5, 7 and 8. If a helicopter which is hovering in the air is excluded from displaying on the display unit, there appears an increased danger that a collision takes place in the air.

To solve the foregoing problem, it is advantageously acceptable that a method of detecting a differential time between the time when response signals from the ATC transponder in the second airplane are received directly by the airplane collision avoidance system in the first airplane and the time when they are received by the latter after they are reflected on the ground surface is employed in addition to the method of the present invention of comparing a relative speed Vr or Vr' of the first airplane with the directional speed vector Vo of the first airplane relative to the second airplane so that a degree of danger incurred by other airplane is determined in accordance with the theories for the aforementioned methods.

Figure 9:
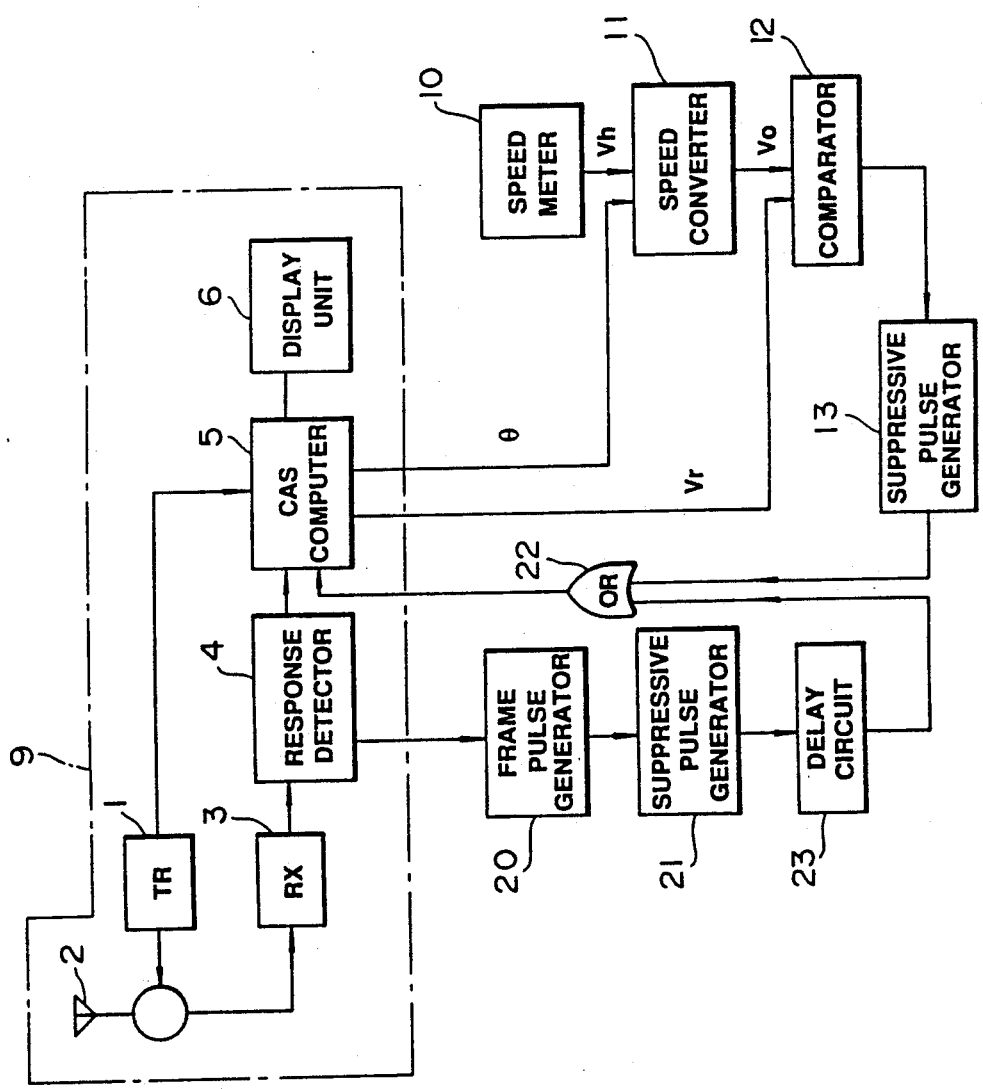
FIG. 9 is a block diagram illustrating another embodiment of the present invention which has been modified from the embodiment as shown in FIG. 5.

FIG. 9 is a block diagram illustrating an embodiment for practicing the foregoing technical idea, wherein the embodiment is such that an error attributable to a differential altitude is no corrected.

This technical idea consists in that direct receiving of framing pulses representative of response signals from the ATC transponder in the second airplane derived from a response detector 4 in the airplane collision avoidance system 9 and indirect receiving of the same after reflection on the ground surface are analized in a framing pulse analyzer 20, when it is found that a difference between the time of direct receiving and the time of indirect receiving after reflection on the ground surface remains within a predetermined threshold, a suppressive pulse generator 21 is activated, an output from the suppressive pulse generator 21 and suppressive pulses generated on the basis of the aforementioned comparison of relative speed of the first airplane relative to the second airplane with speed of the first airplane are inputted into an OR circuit 22, and a display output from the CAS computor is controlled in dependence on an output from the OR circuit 22. Incidentally, a delay circuit 23 is intended to adjust a timing of generation of both signals to be inputted into the OR circuit 22.

Since this technical idea makes it possible to discriminate whether the second airplane stops in the air or it stays in a waiting state, it become possible to avoid a danger of excluding from the alarm display a helicopter which is hovering.

Figure 10A:
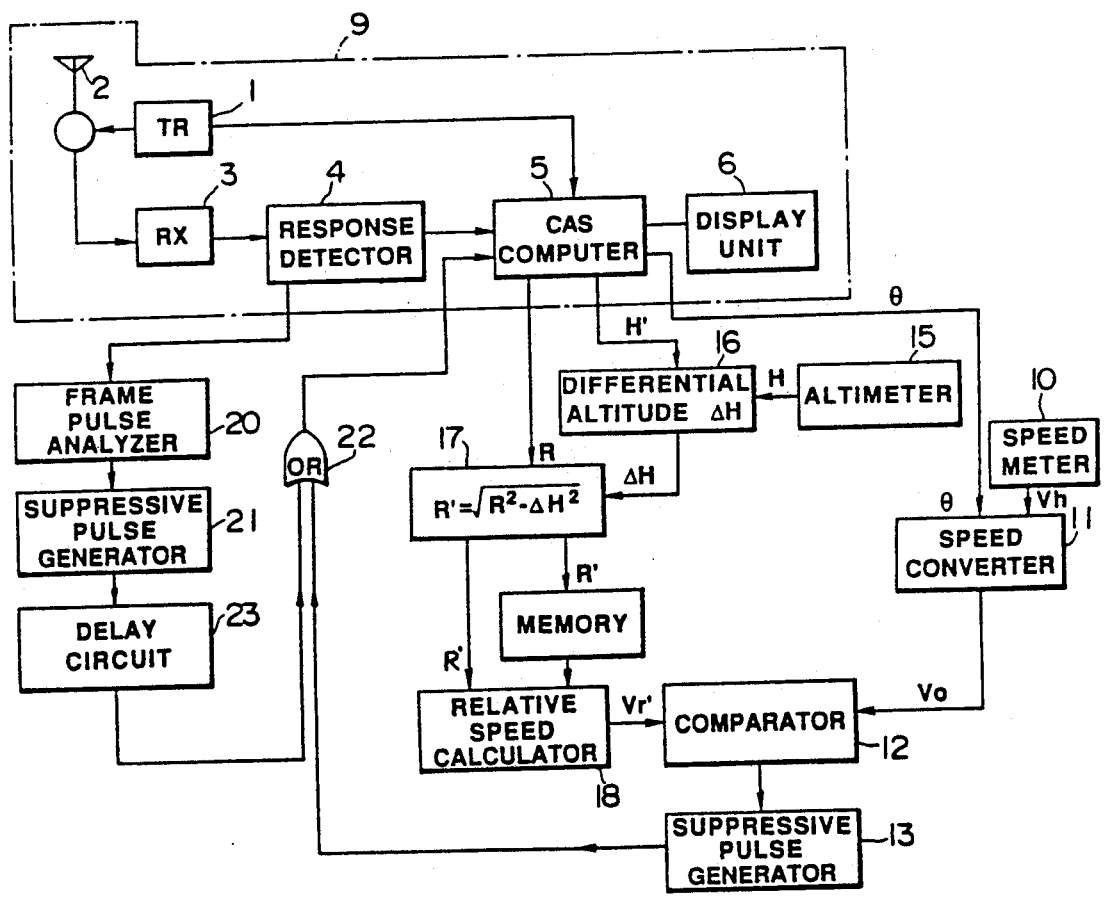
FIGS. 10(a) and 10(b) are block diagrams illustrating another embodiments of the present invention which have been modified from the embodiment as shown in FIG. 9.
Figure 10:
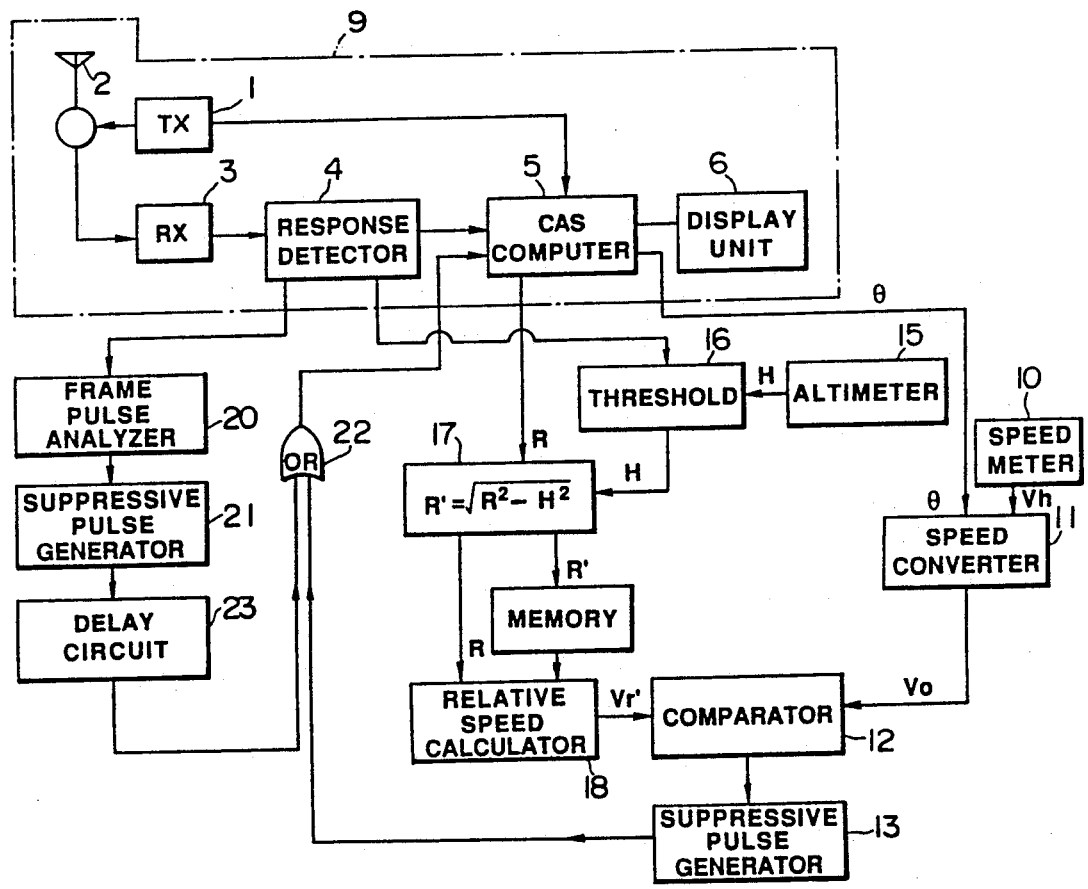

FIGS. 10(a) and 10(b) are block diagrams illustrating an arrangement for determining a degree of danger incurred by the second airplane by additionally employing a method of detecting a difference between the time of direct receiving of response signals from the ATC transponder in the second airplane by the airplane collision avoidance system in the first airplane and the time of indirect receiving of the same after reflection on the ground using the unit as shown in FIGS. 7 and 8.

Figure 11:
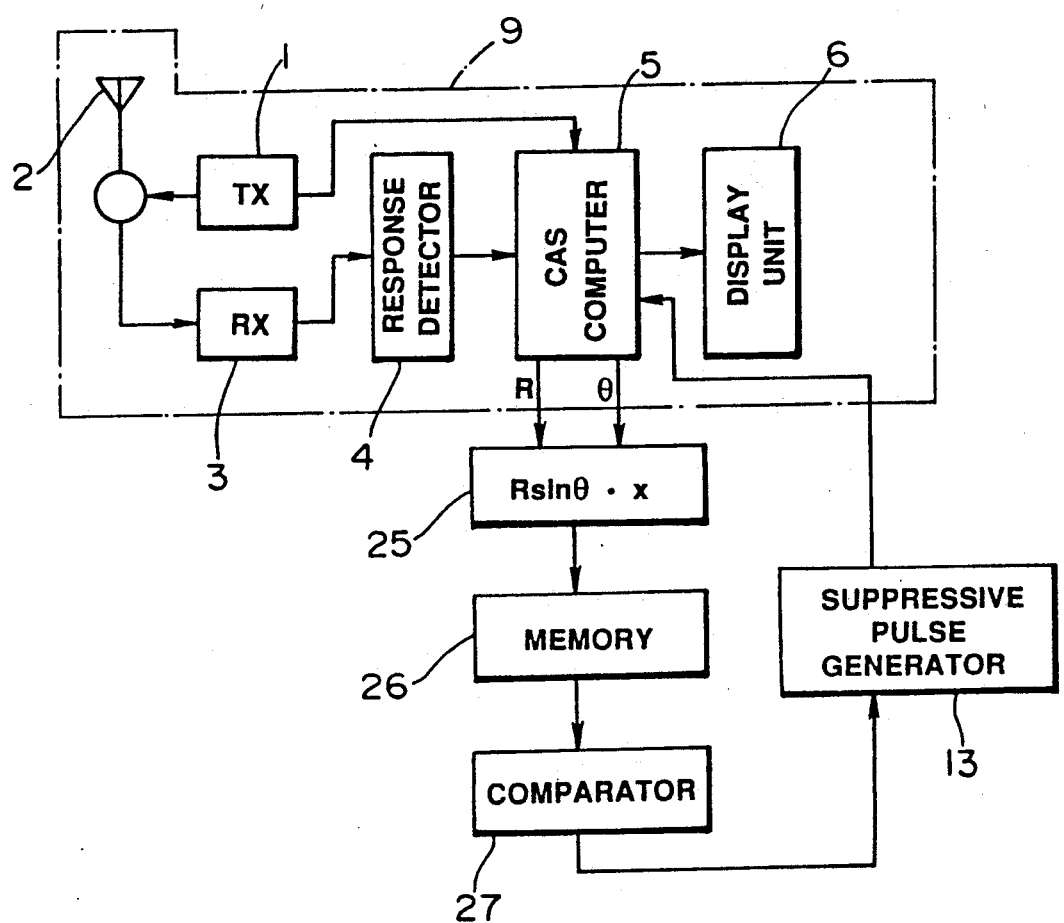
FIG. 11 is a block diagram illustrating another embodiment of the present invention for practicing the technical idea as shown in FIG. 4.

FIG. 11 is a block diagram illustrating an embodiment for practicing the technical idea as shown in FIG. 4. This embodiment is such that a calculator 25 for calculating an equation represented by $R\sin\theta = X$ is connected to a CAS computor 5 in the conventional airplane collision avoidance system 9, a memory 26 in which the aforementioned calculation outputs are successively stored and a comparator 27 in which the contents of the memory 26 are successively compared are provided, activation of the suppressive pulse generator 13 is determined in dependence on results derived from comparisons in the comparator 27, and a determination is made in dependence on presence or absence of output of suppressive pulses as to whether the display unit 6 connected to the CAS computor 5 is activated or not.

Next, operations of the airplane collision avoidance system of the present invention added with the aforementioned arrangements will be described below.

First, question/response between the first airplane and the second airplane located in the vicinity of the former are started. Generally, question/response are repeated by several times. As question/response are repeated in that way, the CAS computor 5 is permitted to know variation of relative distance R between the first airplane and the second airplane. If the antenna for receiving response signals from the second airplane is a directional antenna, an orientation angle $\theta$ of the first airplane relative to the second airplane can be detected.

Then, $R_1\sin\theta_1$, $R_2\sin\theta_2$—are successively calculated in the calculator 25 on the basis of R and $\theta$ derived from the CAS computor 5 to be stored in the memory 26 and they are successively taken therefrom so that they are compared with each other in the comparator 27. When the results derived from the comparison in the comparator 27 reveal that a difference among values of $R\sin\theta$ calculated within a predetermined period of time remains within a predetermined threshold, a determination is made such that the second airplane is stopped, i.e., it stays in a waiting state or in a taxing state. In response to this determination, the suppressive pulse generator 13 is activated and suppressive pulses are then fed to the CAS computor 5 so that display signals to be outputted from the CAS computor 5 is suppressed so as to allow no alarm displaying to be effected in the display unit 6.

With the above construction, a pilot in the first airplane with the airplane collision avoidance system installed therein does not suffer from response signals from the ATC transponder in the second airplane staying in a waiting state on the ground.

However, when the aforementioned system is employed, there is a danger that after a relative positional relationship to be described later is maintained for a predetermined period of time, a determination is erroneously made such that the second airplane which is flying in the air is an airplane staying in a waiting state on the ground.

Figure 12:
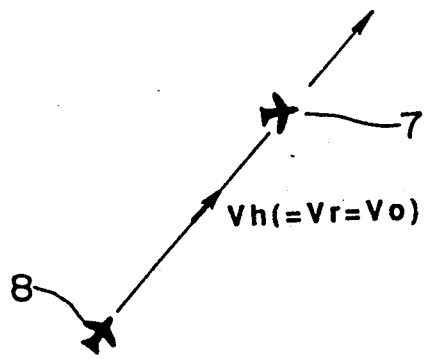
FIG. 12 is a schematic view illustrating a positional relationship between a first airplane and a second airplane.

This is because values of R sin θ become zero without fail, when the relative horizontal angle θ of the first airplane 8 relative to the second airplane 7 is zero, as shown in FIG. 12.

Figure 13:
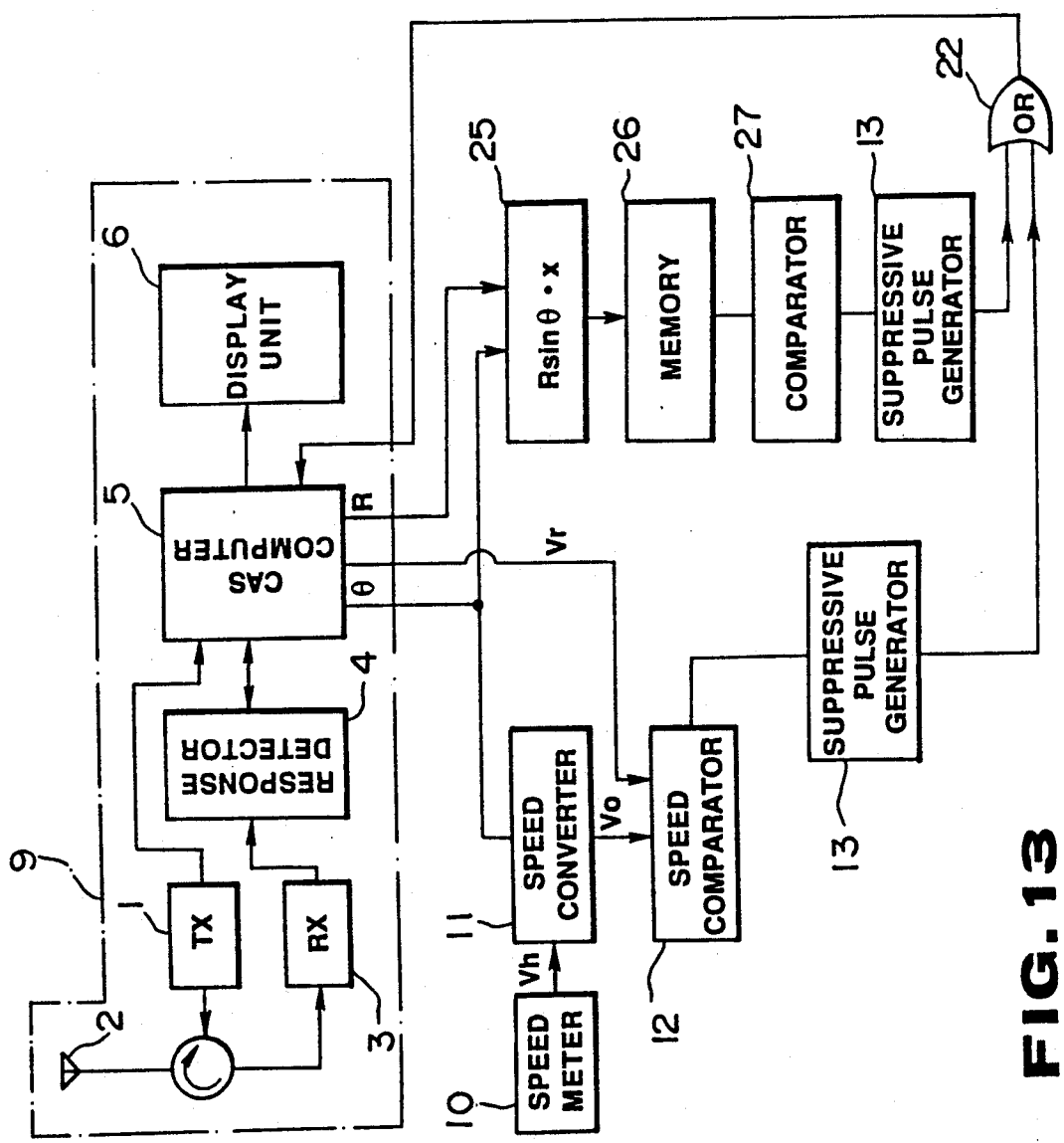
FIG. 13 is a block diagram illustrating another embodiment of the present invention which has been modified from the embodiment as shown in FIG. 11.

To avoid such a danger, it is required that the method shown in FIG. 11 is employed in addition to the method shown in FIG. 5, as shown in FIG. 13. As question/response are repeated, the relative speed Vr of the first airplane relative to the second airplane adapted to be outputted from the CAS computor 5 is compared in a speed comparator 12 with the directional speed vector Vo of the first airplane relative to the second airplane using the speed Vh of the first airplane adapted to be outputted from a speed meter 10 of the first airplane. If it is found that a difference between the relative speed Vr and the directional speed vector Vo is substantially zero, it is determined that the second airplane is stopped, i.e., it remains in a waiting state. Then, an apparatus for generating from the suppressive pulse generator 13 suppressive pulses for inhibiting the second airplane from being displayed is used in combination so that a logical sum of an output from the foregoing device and an output of determination as to whether the value of Rsinθ is invariable or not is inputted into the CAS computor 5 via an OR circuit 22.

With such construction, even in a case where the relative horizontal angle of the first airplane is zero, it becomes possible to reliably discriminate whether the second airplane stays in a waiting state on the ground or it is flying in the air. This leads to a result that safety of the second airplane having the aforementioned apparatus installed therein can be improved further.

Figure 14:
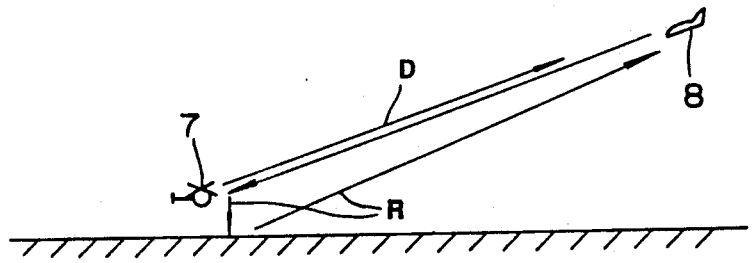
FIG. 14 is a schematic view illustrating direct receiving of response signals from an airplane staying in an immovable state in the air and indirect receiving of the same after reflection on the ground.

It is obvious that like the foregoing embodiment, the apparatus in accordance with this embodiment can not perform a step of discriminating for an airplane relative to the second airplane which can stop in the air such as a helicopter, a VTOL type airplane or the like. To solve the foregoing problem, it is necessary to additionally use a method of making a determination on the basis of a difference between the time of direct receiving of response signals from the ATC transponder in the second airplane 7 as represented by D and the time of indirect receiving of the same after reflection on the ground as represented by R as to whether or not the second airplane 7 is stopped in the air at such an altitude that there is a danger that collision takes place in the air, as shown in FIG. 14.

This method is the same method as shown in FIG. 2. Specifically, a characterizing feature of this method consists in that if it is found that direct receiving D of frame pulses representative of response signals from the ATS transponder in the second airplane 7 by the airplane collision avoidance system in the first airplane 8 in response to question signals from the airplane collision avoidance system in the first airplane 8 and indirect receiving R of the same after reflection on the ground are achieved in a substantially overlapping relationship, it is determined that there is no danger that a collision takes place.

Figure 15:
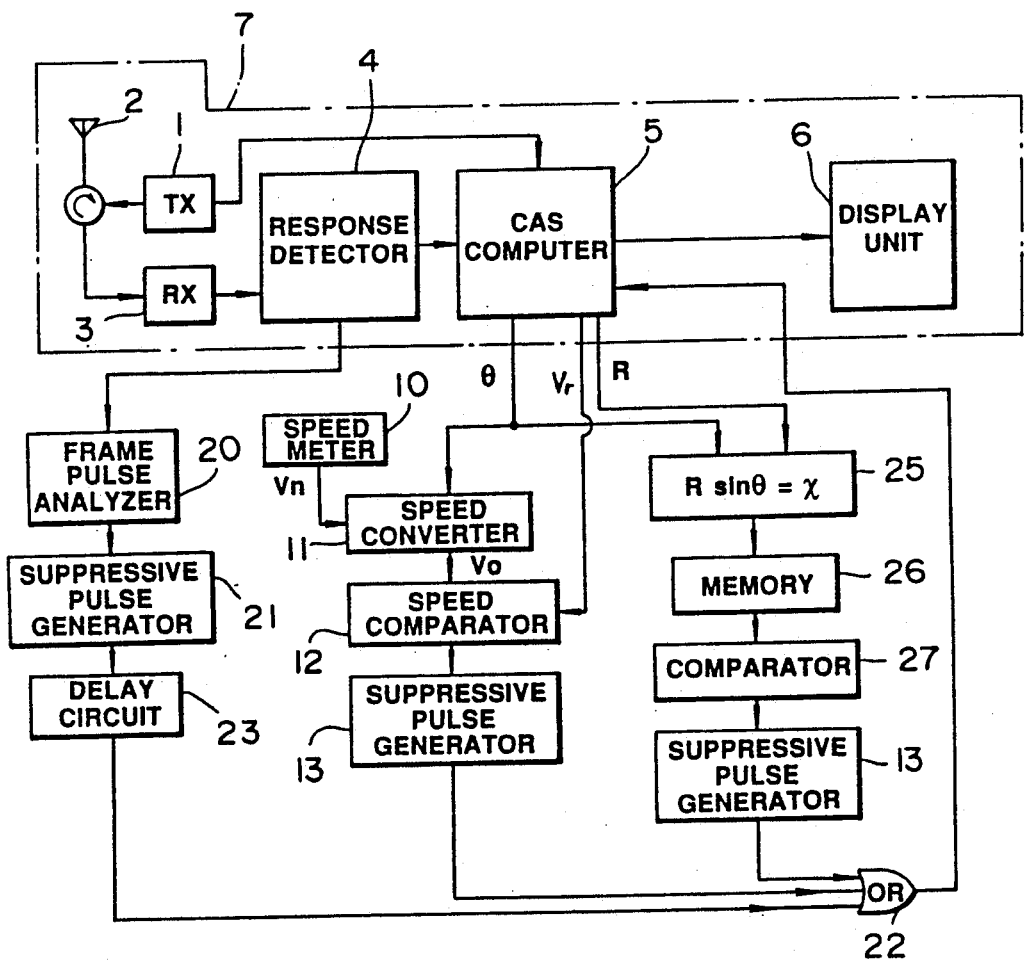
FIG. 15 is a block diagram illustrating another embodiment of the present invention which has been modified from the foregoing embodiments.

FIG. 15 is a block diagram illustrating an airplane collision avoidance system in accordance with another embodiment, wherein the foregoing method is additionally employed.

In the drawing, reference numeral 20 designates a framing pulse analyzer for extracting from an output from the response detector 4 framing pulses representative of response signals from the ATC transponder in the second airplane. This apparatus is intended to detect a difference between the time of direct receiving of framing pulses representative of response signals from the ATC transponder and the time of indirect receiving of the same after reflection on the ground. If the apparatus can not separate both the framing pulses from one another for the purpose of distinguishing one of them from the other, i.e., it is determined that both the signals reach the airplane collision avoidance system at the substantially same time, suppressive pulses are outputted from a suppressive pulse generator 21 and the output from the latter is inputted into the OR circuit 22 via a delay circuit 23 so as to allow a timing of the foregoing output to match with a timing of analyzing an output from the CAS computor 5. Then, a display output from the CAT computor 5 for the display unit 6 is controlled in dependence on an output in terms of a logical sum comprising two factors, one of them being a result derived from a comparison of the relative speed of the first airplane with the directional speed vector of the first airplane relative to the second airplane and the other one being a result derived from a determination as to whether values of R sin θ are constant or not.

Since the airplane collision avoidance system is constructed in the above-described manner, it can discriminate with respect to all airplanes which can be thought by any expert in the art whether an airplane remains in a waiting state or it is flying in the air as long as an ATC transponder is installed therein.

Incidentally, the embodiments in FIGS. 13 and 15 have been described with respect to a case where a differential altitude between the first airplane and the second airplane is not taken into account when a relative speed of the first airplane relative to the second airplane is detected. However, the present invention should not be limited only to this. Obviously, as shown in FIGS. 7 and 8, a differential altitude between the first airplane and the second airplane may be taken into account and moreover a corrected relative speed may be used.

To clearly explain the embodiments of the present invention, various kinds of calculation functions are represented by way of blocks separately from the CAS computor. However, it should of course be understood that they can be practiced within the interior of the CAS computor.

Since the device of the present invention is constructed in the above-described manner, it can substantially reduce a possibility of obstructing the concentration of a pilot's spirit at the time of landing and taking-off due to issuance of unnecessary alarms from an airplane collision avoidance system not only in a region where almost of airplanes carry an ATC transponder operable in accordance with a mode A or a mode C but also in the region like U.S.A. where about 60% of airplanes (based on the research as of 1984) carry an ATC transponder operable in accordance with a mode C.

Further, since additional circuits required for constructing the device of the present invention can be provided at a comparatively inexpensive cost, it can be said that there exists few factor which obstruct wide employment of the system of the present invention.

What is claimed is:

1. A device of suppressing incorrect alarms to be issued from an airplane collision avoidance system installed in a first airplane comprising:
    means for obtaining a relative distance of said first airplane relative to a second airplane on the basis of a difference between the time when said airplane collision avoidance system sends question signals and the time when said airplane collision avoidance system receives response signals from an ATC transponder installed in said second airplane in response to said question signals,
    means for obtaining a relative speed from a quantity of variation of said relative distance per unit time, and
    means for making a determination that said second airplane stays in a waiting state on an airport or it is held substantially immovable when it is found that a product obtained by multiplying plural relative distances by sines of plural relative horizontal angles is substantially constant, said plural relative distances and said plural relative horizontal angles being obtained by repeating the foregoing operations,
    whereby generation of unnecessary alarms is reduced.

2. The device as claimed in claim 1, wherein in addition to the determination means, the device further includes means for discriminating and separating only response signals from the ATC transponder in said second airplane staying in a waiting state on the airport or flying in the air in the vicinity of the ground from other response signals on the basis of a difference between the time when response signals from the ATC transponder in said second airplane in response to question signals issued from the airplane collision avoidance system in said first airplane reach the airplane collision avoidance system in said second apparatus directly and the time when they reach there indirectly after reflection on the ground so that response signals from an ATS transponder installed in an airplane held in an immovable state in the air are not excluded from the watching range in accordance with a logic which is concerned with discriminating signals generated from both the functions.

3. A device of suppressing incorrect alarms to be issued from an airplane collision avoidance system installed in a first airplane comprising;
    means for obtaining a relative distance of said first airplane from a second airplane on the basis of a difference between the time when said airplane collision avoidance system sends question signals and the time when said airplane collision avoidance system receives response signals from an ATC transponder in said second airplane in response to said question signals,
    means for obtaining a relative horizontal angle of said first airplane relative to said second airplane by detecting the direction that response signals sent from the ATC transponder in said second airplane reach said first airplane using the airplane collision avoidance system, and
    means for making a determination that said second airplane stays in a waiting state on the airport or it is held substantially immovable when it is found that a product obtained by multiplying plural relative distances by sines of plural relative horizontal angles is substantially constant, said plural relative distances and said plural relative horizontal angles being obtained by repeating the foregoing operations,
    whereby generation of unnecessary alarms is reduced.

4. The device as claimed in claim 3, wherein in addition to the means for making a determination that said second airplane stays in a waiting state, the device further includes means for making a determination that said second airplane stays in a substantially waiting state on the airport on the basis of a determination that a difference between the speed of said first airplane as seen in the direction toward said second airplane and the relative speed of said first airplane relative to said second airplane obtained by repeating question/response using said airplane collision avoidance system so that response signals from an ATC transponder installed in an airplane which is held in an immovable state in the air are not excluded from the watching range in accordance with a logic which is concerned with discriminating signals generated on the basis of both the functions.

5. The device as claimed in claim 4, wherein in addition to the means for making a determination that said second airplane stays in a waiting state, the device further includes means for discriminating and removing only response signals from the ATC transponder installed in said second airplane which stays in a waiting state on the airport or is flying in the air in the vicinity of the ground from other response signals on the basis of a difference between the time when response signals from the ATC transponder installed in said second airplane in response to question signals issued from said airplane collision avoidance system in said first airplane reach the latter directly and the time when they reach there indirectly after reflection on the ground so that response signals from an ATC transponder installed in an airplane which is held in an immovable state in the air are not excluded from the watching range in accordance with a logic which is concerned with discriminating signals generated on the basis of the foregoing functions.

* * * * *